Patented Aug. 5, 1924.

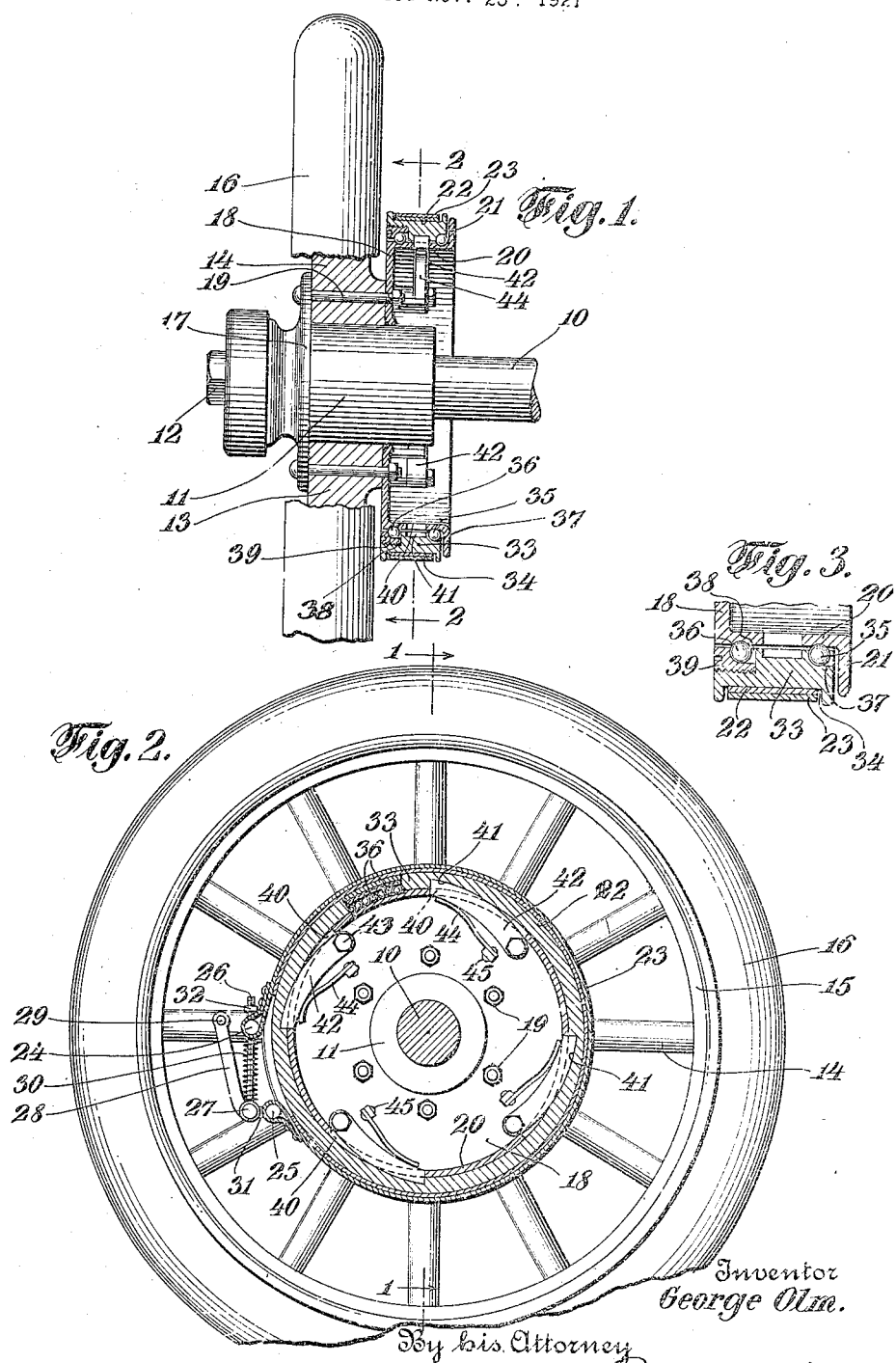

1,503,845

UNITED STATES PATENT OFFICE.

GEORGE OLM, OF NEW YORK, N. Y.

VEHICLE HUB CLUTCH.

Application filed November 25, 1921. Serial No. 517,598.

*To all whom it may concern:*

Be it known that I, GEORGE OLM, a citizen of Germany, and resident of 3349 Third Ave., New York city, in the county of Bronx and State of New York, have invented certain new and useful Improvements in Vehicle Hub Clutches, of which the following is a specification.

The object of this invention is to provide a positive drive clutch for automobiles and like vehicles of self-propelled type, in which the rear axle is power-driven, but allows the wheels to turn freely in a reverse direction.

A further object is to produce a brake band ring so mounted upon the brake drum as to be substantially frictionless in backing the vehicle, irrespective of the setting of the brakes.

These and other analogous objects are attained by the novel construction, combination and arrangement of parts hereinafter described and shown in the accompanying drawing, forming a material part of this disclosure, and in which:

Fig. 1 is a partial side elevational, partial sectional view of a brake drum construction showing the invention.

Fig. 2 is a transverse sectional view taken on line 2—2 of Fig. 1, parts being broken away to show the construction.

Fig. 3 is an enlarged fragmentary sectional view taken transversely of the brake drum and engaged elements.

In the drawing the numeral 10 designates a fragmentary part of an axle upon the end of which is a wheel hub center 11 held in position by the nut 12, and encircled by the wheel hub body 13 from which radiate spokes 14 to the rim 15, here shown as provided with a pneumatic tire 16.

On the outer side of the wheel hub is a flange 17, formed with the hub center 11, and on the inner side is the brake drum disc or washer like element 18, bolts 19 passing through and tightly clamping these three elements in firm engagement.

Formed with the disc 18 is the brake drum 20, the same being cylindrical and extending inwardly to its out-turned flanged inner edge 21 in the manner common to such devices.

So too is the brake band comprised of an inner fabric layer 22 and an outer metallic layer 23, the latter being formed with eyes at its ends to receive pivot studs 24 and 25, the stud 24 having passing transversely through it a screw threaded rod 26 engaging at its opposite end another stud 27 which acts as a pivot for the bell-crank lever 28 engaging a brake rod (not shown) by the pin 29.

A coiled expansion spring 30 encircles the rod 26, its end abutting the sides of the studs 24 and 27, tending to spread the ends of the brake band and normally maintain it out of frictional contact with the rotative element of the brake drum.

The short end 31 of the bell-crank lever engages the stud 25 so that, as the lever 28 is moved, the band can be tightened and a nut 32 on the rod 26 provides for any desired adjustment and wear.

Interposed between the brake band and brake drum is a ring 33 having a peripheral groove 34 to receive the band and maintain it in operative position.

The ring is floatingly engaged upon the surface of the drum 20 by the interposition of two rows of hardened steel balls 35 and 36, the former being partially seated in a circumferential groove in the brake drum near its flange 21 and the latter row of balls 36 rest in a similar groove near the outer edge of the drum.

The balls 35 are also partially seated in a groove 37 formed interiorly of the ring and the balls 36 are held in place in a similar groove 38 formed in the inner surface of a screw threaded clamp ring 39 fitted into the main ring 33; thus the ring 33 is free to rotate in either direction on the surface of the brake drum.

The drum 20 contains a plurality of open elongated slots 40, four being shown, and a corresponding number of cavities 41 are formed in the interior of the ring 30, these cavities agreeing in register with the slots 40 and are so shaped as to receive the free ends of pawls 42, pivoted on studs 43 fixed in the brake disc 18, and pressed outwardly into engagement by bent-flat springs 44 fixed on posts 45 also set in the disc 18.

From the foregoing it will be seen that, as the brake drum is rigid with the wheel hub, and the hub is fixed upon the axle, when the latter is rotated to advance the vehicle in a forward direction, the pawls will engage in the cavities of the ring 33 and cause it to turn with the wheel or transmit a braking effect to the shaft if the brake band be set.

It will also be obvious that if the brakes are not set, the ring will freely rotate in either direction, and further, if the brakes are set and the axle turned reversely, that is to back the vehicle, the pawls will move out of the cavities and permit the vehicle to run backward, the springs returning the pawls to operative position upon a forward turning of the axle.

From the foregoing it will be seen that a practical device for the purpose has been described which will be readily understood by those familiar with the art; however, as changes of construction could be made within the scope of the invention, it is intended that all matter contained in the foregoing description or shown in the drawing shall be interpreted as illustrative and not in a limitative sense.

Having thus described my invention and set forth the manner of its construction, application and use, what I claim as new and desire to secure by Letters Patent, is:—

A vehicle wheel hub brake comprising, in combination with a driven axle, a wheel fixed at one end thereof, a disc secured to the inner side of the hub of said wheel, a brake drum formed with said disc, said drum having an outwardly flanged edge, a brake band encircling said drum, and means for tightening said band, of a ring interposed between said drum and band, anti-frictional elements between said drum and ring, means for maintaining said anti-frictional elements in adjustment, pawls pivoted on said disc, said pawls passing through slots in said brake drum and being engageable in recesses in said ring, and means carried by said disc for causing such engagement.

Signed at New York, in the county of New York and State of New York, this 14 day of November A. D. 1921.

GEORGE OLM.